United States Patent
Schultz et al.

(10) Patent No.: US 8,433,988 B2
(45) Date of Patent: Apr. 30, 2013

(54) METHOD AND APPARATUS FOR MASKING SIGNAL LOSS

(75) Inventors: Mark Alan Schultz, Carmel, IN (US); Ronald Douglas Johnson, Westfield, IN (US)

(73) Assignee: Thomson Licensing, Boulogne Billancourt (FR)

( * ) Notice: Subject to any disclaimer, the term of this patent is extended or adjusted under 35 U.S.C. 154(b) by 239 days.

(21) Appl. No.: 12/736,095

(22) PCT Filed: Dec. 3, 2008

(86) PCT No.: PCT/US2008/013303
§ 371 (c)(1),
(2), (4) Date: Sep. 9, 2010

(87) PCT Pub. No.: WO2009/116974
PCT Pub. Date: Sep. 24, 2009

(65) Prior Publication Data
US 2011/0004815 A1    Jan. 6, 2011

Related U.S. Application Data

(60) Provisional application No. 61/070,074, filed on Mar. 20, 2008.

(51) Int. Cl.
*G06F 11/00* (2006.01)
*G08C 25/00* (2006.01)
*H03M 13/00* (2006.01)
*H04L 1/00* (2006.01)

(52) U.S. Cl.
USPC ............... 714/799; 714/776; 704/278

(58) Field of Classification Search ............ 714/776, 714/799; 704/278
See application file for complete search history.

(56) References Cited

U.S. PATENT DOCUMENTS

| 4,837,623 | A | 6/1989 | Motoyama |
| 6,792,047 | B1 | 9/2004 | Bixby et al. |
| 2002/0141740 | A1 | 10/2002 | Matsui |
| 2004/0095964 | A1 | 5/2004 | Meylan et al. |
| 2005/0044471 | A1* | 2/2005 | Chia et al. ............ 714/776 |
| 2005/0166124 | A1* | 7/2005 | Tsuchinaga et al. ........ 714/776 |
| 2006/0271978 | A1 | 11/2006 | Watanabe |
| 2007/0094579 | A1 | 4/2007 | Cerrato Sanchez |
| 2008/0033718 | A1 | 2/2008 | Zopf et al. |
| 2008/0208598 | A1* | 8/2008 | Endo et al. ........... 704/278 |
| 2009/0106804 | A1* | 4/2009 | Bhogal et al. ........... 725/110 |
| 2009/0144769 | A1* | 6/2009 | Liebhold et al. ........... 725/39 |

FOREIGN PATENT DOCUMENTS

| CA | 2 507 612 A1 | 7/2004 |
| CN | 1387338 A | 12/2002 |
| EP | 1 727 367 A2 | 11/2006 |
| WO | 2007/053147 A1 | 5/2007 |

OTHER PUBLICATIONS

Essa, et al., "A Novel Recovery Technique for Lost Internet Video Frames Simulation and Evaluation", WSEAS Transaction on Computer Res., Iss. 2, vol. 1, Dec. 2006, p. 300-306.
Bopardikar, et al., "A Temporal Error Concealment Algorithm Based on Structural Alignment for Packet Video", 2004 SPCOM, p. 373-377.
International Search Report dated Mar. 8, 2010.
* cited by examiner

*Primary Examiner* — Sam Rizk
(74) *Attorney, Agent, or Firm* — Robert D. Shedd; Reitseng Lin (57) ABSTRACT

A method and apparatus are capable of masking a signal loss condition. According to an exemplary embodiment, the method includes steps of receiving a signal, detecting a period of loss of the signal, and enabling a received portion of the signal to be reproduced continuously and causing a portion of the signal lost during the period to be skipped.

12 Claims, 5 Drawing Sheets

METHOD AND APPARATUS FOR MASKING SIGNAL LOSS

CROSS REFERENCE TO RELATED APPLICATION

This application claims the benefit, under 35 U.S.C. §365 of International Application PCT/US2008/013303, filed Dec. 3, 2008, which was published in accordance with PCT Article 21(2) on Sep. 24, 2009 in English and which claims the benefit of United States provisional patent application No. 61/070,074 filed Mar. 20, 2008.

BACKGROUND OF THE INVENTION

1. Field of the Invention

The present invention generally relates to techniques for distributing and reproducing signals such as audio and/or video signals, and more particularly, to a method and apparatus for masking signal loss conditions during signal distribution and reproduction.

2. Background Information

Signal distribution and reproduction networks have become increasingly popular in today's society. For example, signals such as audio and/or video signals are now often distributed via mobile networks, such as on buses, trains, airplanes, subways, and/or ships. Of course, signals provided from cable, terrestrial, satellite and/or Internet sources are also distributed in stationary networks, such as in home and business dwellings. Both mobile and stationary networks are susceptible to signal loss conditions. Signal loss conditions can occur, for example, due to rain fade, high winds, power surges, loss of sight of satellite, switching between pieces of equipment and/or other events. In mobile networks, signal loss may occur more frequently than in stationary networks, due to the moving nature of these systems. In any event, signal loss conditions can be particularly annoying and frustrating for users as such conditions disrupt their listening and/or viewing experience.

Accordingly, there is a need for a method and apparatus that is capable of addressing the aforementioned problems by masking signal loss conditions during signal distribution and reproduction. The present invention described herein addresses these and/or other issues.

SUMMARY OF THE INVENTION

In accordance with an aspect of the present invention, a method is disclosed. According to an exemplary embodiment, the method comprises steps of: receiving a signal, detecting a period of loss of the signal, and enabling a received portion of the signal to be reproduced continuously and causing a portion of the signal lost during the period to be skipped.

In accordance with another aspect of the present invention, an apparatus is disclosed. According to an exemplary embodiment, the apparatus comprises means such as an input for receiving a signal including at least one of audio and video content. Means such as a detector detects a period of loss of the signal. Means such as a controller enables a received portion of the signal to be reproduced continuously and causes a portion of the signal lost during the period to be skipped.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
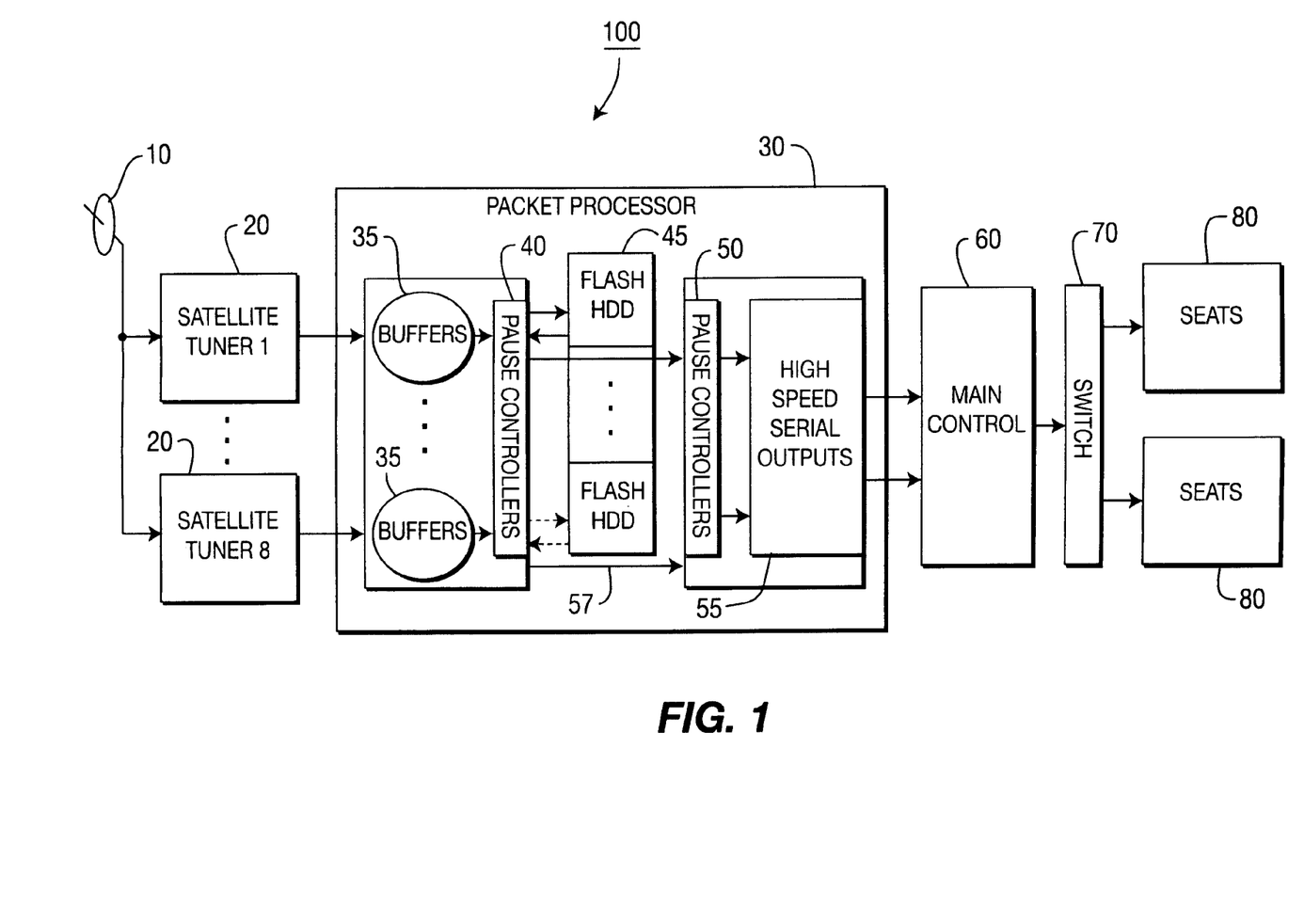
FIG. 1 is a diagram of a configuration according to an exemplary embodiment of the present invention.

Referring now to the drawings, and more particularly to FIG. 1, a diagram of a configuration 100 according to an exemplary embodiment of the present invention is shown. For purposes of example and explanation, the exemplary configuration 100 of FIG. 1 represents a system that may be used to distribute signals including audio and/or video signals received from a satellite network to a plurality of users, such as passengers on a bus, train, airplane, subway, ship and/or other mobile location for reproduction. However, it should be intuitive to those skilled in the art that the principles of the present invention may also be applicable to other types of configurations and systems, including those in home and business dwellings, as well as those that receive signals from other types of networks (e.g., cable, terrestrial, Internet, etc.).

As indicated in FIG. 1, configuration 100 comprises an antenna 10, a plurality of satellite tuner devices 20, a packet processor 30, a main control block 60, a switching block 70 and a plurality of passenger seats 80. Packet processor 30 comprises a plurality of buffers 35, an input side pause controller 40, a flash hard disc drive (HDD) 45, an output side pause controller 50, and high speed serial output ports 55. For clarity of description, certain conventional elements associated with configuration 100 such as certain control signals, power signals and/or other elements may not be shown in FIG. 1.

In operation, signals including audio and/or video signals are received via antenna 10 and provided to satellite tuner devices 20 which each performs various known signal processing functions including tuning, analog-to-digital conversion, demodulation, forward error correction and/or other functions to thereby provide streamed packets of digital audio and/or video data to a corresponding set of buffers 35 in packet processor 30. While the exemplary configuration 100 of FIG. 1 includes eight (8) satellite tuner devices 20, this number may vary in practice according to factors including design choice. Packet processor 30 is operative to perform various digital packet processing functions. According to principles of the present invention, packet processor 30 is operative to detect periods of signal loss and enable a received portion of a signal to be reproduced continuously while causing a portion of the signal lost during the period of signal loss to be skipped.

Packet processor 30 also enables users to be notified in the event of a signal loss condition, including a notification regarding the duration of the signal loss period. In this manner, packet processor 30 helps solve the specific problems described previously herein by enabling signal loss conditions to be masked during signal distribution and reproduction. Further details regarding the operation of packet processor 30 will be provided later herein. Outputs from packet processor 30 are provided to main control block 60 which acts as a filter to provide requested audio and/or video signals to users in seats 80 via switching block 70 in response to user inputs. According to an exemplary embodiment, each seat or set of seats 80 may include its own set-top box or other device which is operative to decode and process received audio and/or video signals for ultimate output to one or more users, and user input means such as a keypad, remote control and/or other input element for receiving user inputs such as channel change commands and/or other user commands.

Figure 2:
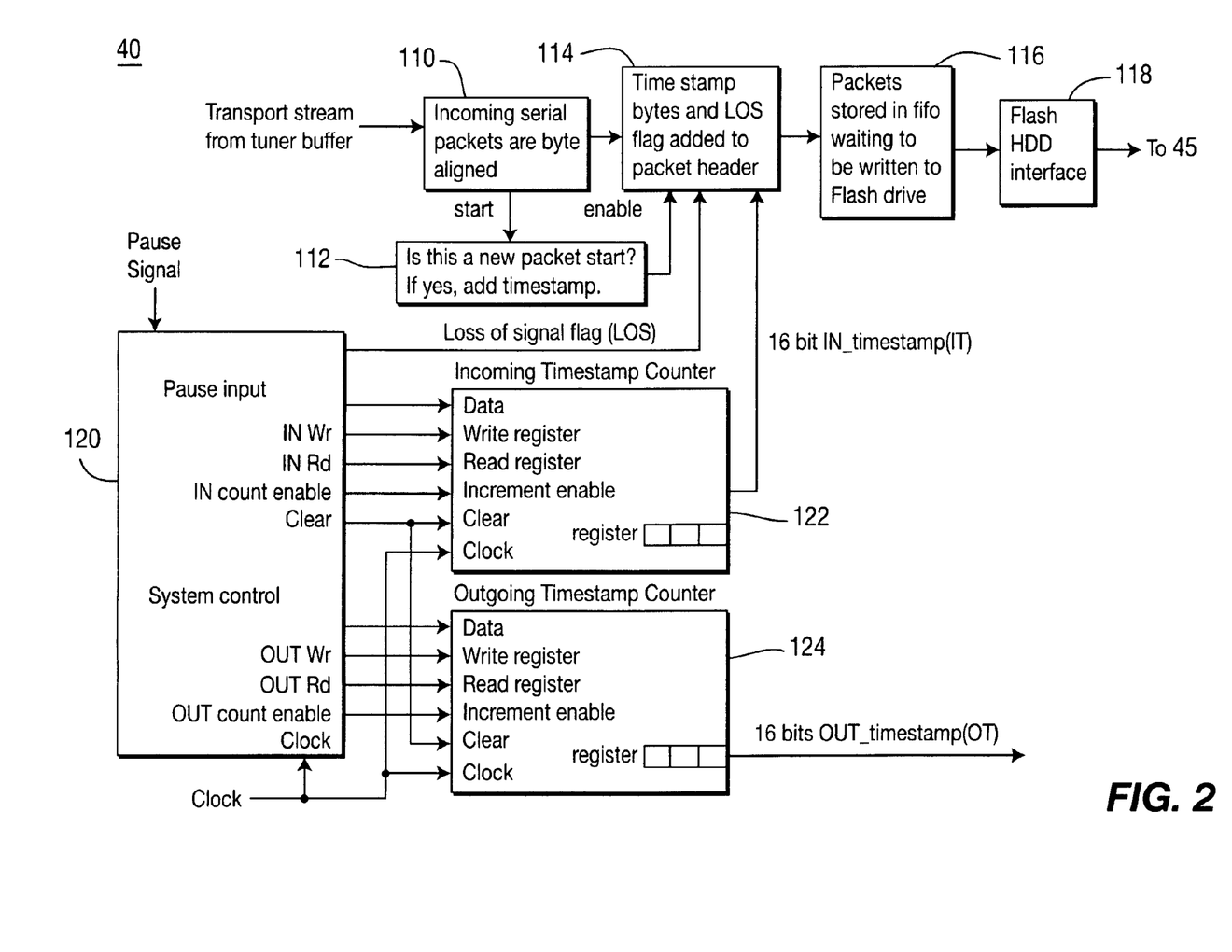
FIG. 2 is a diagram illustrating further details of the input side pause controller included in the packet processor of FIG. 1.

Referring to FIG. 2, a diagram illustrating further details of input side pause controller 40 included in packet processor 30 of FIG. 1 is shown. In FIG. 2, as incoming serial data packets are received at block 110, they are byte aligned and flagged by an extra start bit to show when each packet begins. Whenever a start flag is found at block 112, two bytes of timestamp data (IN_timestamp or (IT)) provided from an incoming timestamp counter 122 is added the packet header at block 114. A loss of signal (LOS) flag from a system control block 120 may also be added to the packet header at block 114, if applicable. Further details regarding the LOS flag will be provided later herein. The packets from block 114 are then stored in a first-in, first-out (FIFO) memory at block 116 and subsequently are written to flash HDD 45 (see FIG. 1) via a flash HDD interface block 118.

According to an exemplary embodiment, software executed by system control block 120 constructs a navigation table using set intervals of time to record the IN_timestamp (IT) generated by incoming timestamp counter 122 and the memory address in flash HDD 45 (see FIG. 1) where this data starts. This allows very quick access to the data once a known delay is defined. FIG. 2 also includes an outgoing timestamp counter 124 which generates a two byte outgoing timestamp (OUT timestamp or (OT)) indicating when each packet is written to flash HDD 45. Outgoing timestamp counter 124 is similar to incoming timestamp counter 122. The primary difference in the use of these two counters 122 and 124 is that an offset in outgoing timestamp counter 124 is used to provide a real-time output reference 57 (see FIG. 1) for the stored data.

Figure 3:
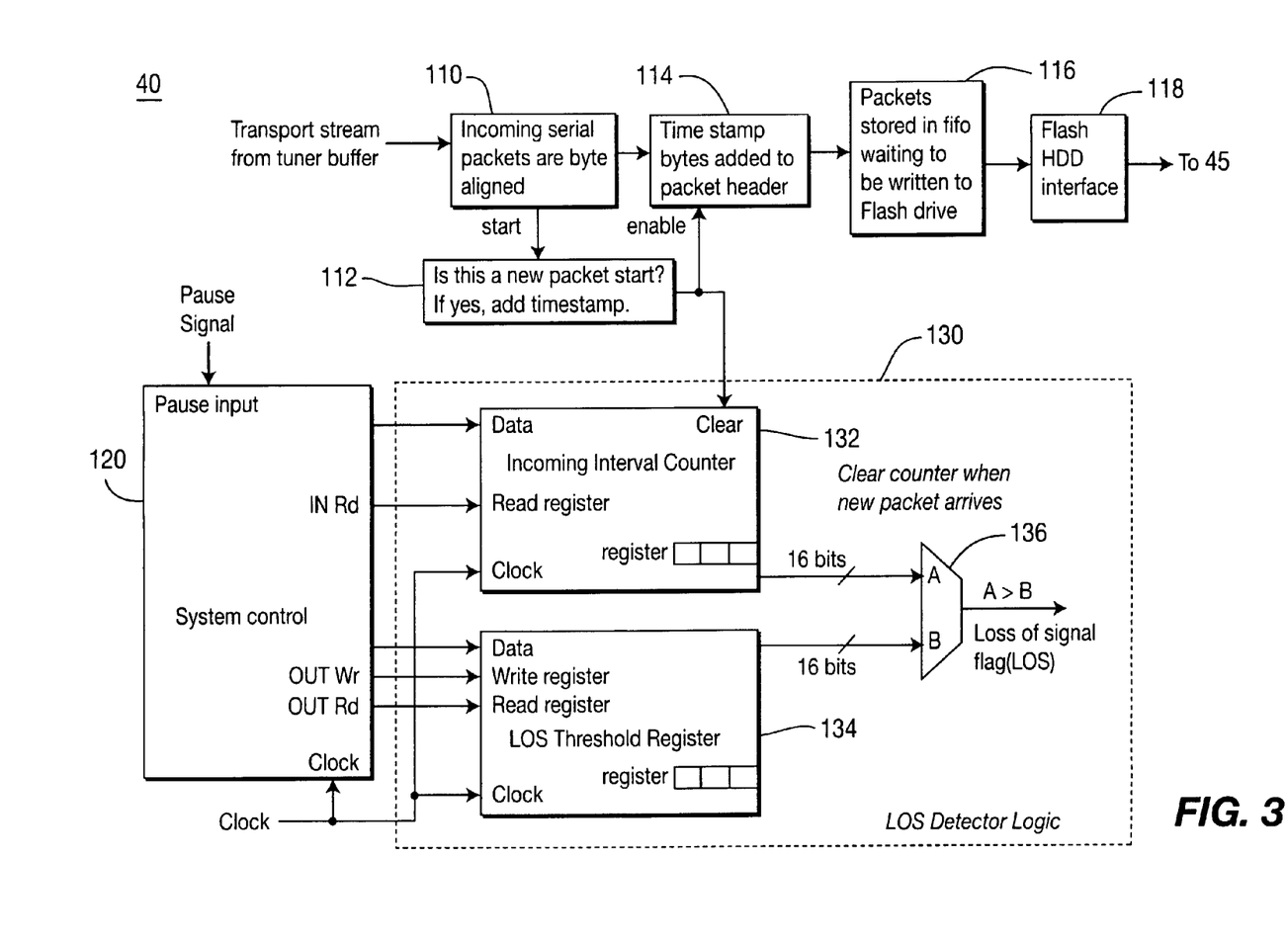
FIG. 3 is another diagram illustrating further details of the input side pause controller included in the packet processor of FIG. 1.

Referring to FIG. 3, another diagram illustrating further details of input side pause controller 40 included in packet processor 30 of FIG. 1 is shown. The diagram of FIG. 3 includes a number of blocks that are identical or similar to certain blocks of FIG. 2, which have been previously described above. These common blocks are represented using the same reference numbers in FIGS. 2 and 3. One primary aspect of FIG. 3 is LOS detector logic 130 which is operative to detect periods of signal loss. As indicated in FIG. 3, LOS detector logic 130 comprises an incoming interval counter 132, a LOS threshold register 134 and a comparator 136. Incoming interval counter 132 is operative to perform a counting operation to generate a corresponding count value and is cleared when each new packet of data arrives. LOS threshold register 134 is operative to output a threshold value, which may be set according to design choice.

Comparator 136 is operative compare the count value (i.e., value A) generated by incoming interval counter 132 to the threshold value (i.e., value B) output from LOS threshold register 134. According to an exemplary embodiment, when the count value (i.e., value A) generated by incoming interval counter 132 is greater than the threshold value (i.e., value B) output from LOS threshold register 134, the LOS flag is generated. As previously shown in FIG. 2, this LOS flag may be output from system control block 120 and added to the packet header at block 114 to indicate that a pre-defined period of signal loss has been detected.

Figure 4:
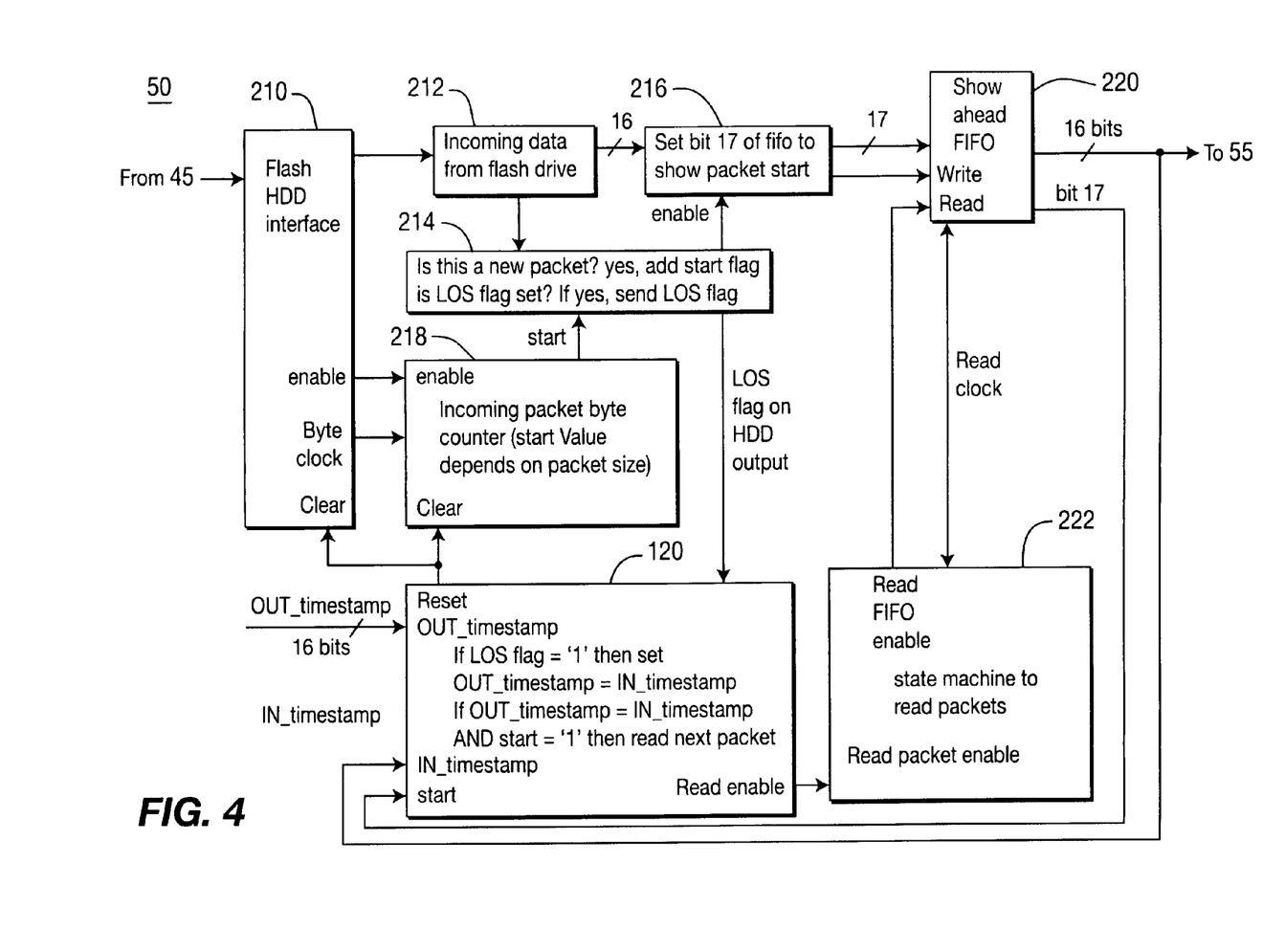
FIG. 4 is a diagram illustrating further details of the output side pause controller included in the packet processor of FIG. 1.

Referring to FIG. 4, a diagram illustrating further details of output side pause controller 50 included in packet processor 30 of FIG. 1 is shown. As indicated in FIG. 4, incoming data read from flash HDD 45 is received via flash HDD interface block 210 at block 212. When a pause delay is known, the navigation table of system control block 120 may be used to find the proper read address in flash HDD 45 for the data. During this time, incoming data may be being stored in flash HDD 45 without any interruptions. The desired data is streamed from flash HDD 45 and packets thereof are counted via incoming packet byte counter block 218. If an incoming data packet is deemed a new packet at block 214, a set start flag is added as the $17^{th}$ bit at block 216 and the packet is stored in a show ahead FIFO block 220. This type of FIFO places the data for the next read cycle on an output bus so that only a read operation is required to latch the FIFO data value. This also has a very useful feature of allowing system control block 120 to see the incoming timestamp (IN_timestamp) whenever the start bit (i.e., bit 17 in this example) is equal to "1".

The next packet of data is not read from show ahead FIFO block 220 until system controller 120 compares the outgoing timestamp (OUT_timestamp) with the incoming timestamp (IN-timestamp). When the start flag is "1" and the two timestamps are equal, the next packet will be read. This re-creates the original bit rates found when the data was received so that certain buffers downstream (not shown) will not overflow. Once the two timestamp values are equal, a state machine block 222 will enable a read operation for an entire packet and then stop the flow again until the incoming timestamp (IN_timestamp) is greater than or equal to the outgoing timestamp (OUT_timestamp). Also in FIG. 4, if a LOS flag is detected as set at block 214, system control block 120 is informed of this condition, and in response, sets the incoming timestamp (IN_timestamp) equal to the outgoing timestamp (OUT_timestamp).

The present invention described above including the system and apparatus embodied by pause controllers 40 and 50 is capable of improving the viewing and/or listening experiences of users by masking temporary signal loss conditions and not showing a blank or frozen screen that is found in current today systems. In such systems, when the signal is disrupted, the user may see a blank screen that says "loss of signal" or a frozen picture. By combining pause function circuitry with circuitry including a detector capable of detecting a pre-defined signal loss period, the present invention is able to mask signal loss conditions by enabling a received portion of a signal to be reproduced continuously on a display and causing a portion of the signal lost during the detected signal loss period to be skipped. The exemplary embodiments described herein are not designed to recover lost data, but are capable of skipping over the lost data so that a viewer/listener will not have to watch/listen to a predetermined output message (e.g., "loss of signal" message) or watch a frozen picture for seconds or even minutes. The inventive principles of the present invention can be used for detecting signal loss either at the transmitter or anywhere in a signal receiving path.

The present invention described herein discloses how to coordinate at least the following combination of features: (i) a pause or temporary storage system that is operative to buffer digital data, including audio and/or video content, for any pre-defined time period, such as from 1-2 minutes to 1-2 hours or more; (ii) means for detecting if a signal is lost for any pre-defined time period, including even momentary losses; (iii) means for using a loss of signal detection to change the location of a pause pointer to skip over the time period being lost; and/or (iv) means for providing a signal to communicate a message to a viewer/listener indicating a detected signal loss condition, such as a message indicating that a signal loss condition occurred for a specified time period and data was lost, but that this time period has been skipped over for their convenience.

In practice, the system embodying the present invention should be designed to include consideration of a number of factors, such as the frequency and length of outages for the specific system being considered. For example, flash HDD 45 (see FIG. 1) may preferably be sized to accommodate at least the typical loss of signal for the time period that a user (e.g., passenger, etc.) is using the system. Also for example, a public system including signal reproduction sites such as on trains, buses, and airplanes may have the ability to be rebooted every hour, or every 12 hours, which may reduce the required size of the memory (e.g., flash HDD 45 in FIG. 1). These public systems may also be subject to announcements that disrupt signal distribution during the announcement period.

To provide the reader with an even better understanding of the inventive principles described herein and the problems it solves, a more detailed description of the general operation of at least one exemplary embodiment of the present invention will now be provided.

According to at least one exemplary embodiment, the system works as follows: the system starts receiving audio and/or video content earlier than the user has access thereto. This means that flash HDD 45 in FIG. 1 becomes active as soon as the system is reset and begins filling with received audio and/or video content for a pre-defined time period (e.g., five minutes, etc.) before the user can start viewing and/or listening to the content. Note that flash HDD 45 can operate as a pause buffer for the entire service, or may include individual pause buffers that provide the pause feature on a per channel basis.

LOS detector logic 130 of FIG. 3 monitors the incoming data to detect a loss of signal condition as flash HDD 45 is being filled. For almost all video services, a certain data rate is expected over a set interval, such as 3 megabits per second for a video program on many satellite signals or 20 megabits per second for ATSC signals. Signal loss detectors such as LOS detector logic 130 of FIG. 3 can be located at the transmitter or anywhere in a signal receiving path. For example, such detectors may be implemented in satellite tuner devices 20 of FIG. 1 that can show a total loss of signal, in packet transport demultiplexer processors (not shown in FIGS.) that can monitor and route the arrival of packets over time, or in memory controllers of system control block 120 that detect when data write buffers become empty due to the lack of new data arriving. The type of detector(s) used in practice should be defined on a system level since sometimes only one program out of many is being lost, while other times all programs are being lost. Flash HDD 45 can be controlled to skip over an entire system pause buffer or individual pause buffers that can exist on an individual program level.

As previously indicated herein, LOS detector logic 130 of FIG. 3 generates a LOS flag when a signal loss condition is detected. Since flash HDD 45 only stores the incoming signal when the signal is available, no additional storage will occur during loss of signal. No action is required from the memory write function of system control block 120 during this time. The memory read function of system control block 120 does need to be modified since normally this is controlled by timestamps and now the time stamped data being requested is not available. As previously indicated in FIG. 2, packet processor 30 includes incoming timestamp counter 122 and outgoing timestamp counter 124 that provide the relative timestamps. System control block 120 is operative to jump ahead to the next valid timestamp in flash HDD 45 when a discontinuity is found. Without this feature, the system will play back the signal loss interruption just as it is received, which will include the loss of signal time periods.

For purposes of example and explanation, assume that flash HDD 45 is being filled five minutes ahead of the audio and/or video being output for the user. In this example, assume that the incoming timestamp (IN_timestamp) indicates 10 minutes, 3 seconds and the outgoing timestamp (OUT_timestamp) indicates 5 minutes, 3 seconds. When the incoming signal is lost for one minute, the incoming timestamp (IN_timestamp) advances, but no data is written into flash HDD 45. After one minute, the incoming timestamp (IN_timestamp) is now at 11 minutes, 3 seconds, but no data is found between the 10 minute, 3 second time mark and the 11 minute, 3 second time mark. When the signal comes back, the data starts being stored again in flash HDD 45 with the incoming timestamps being after the 11 minute, 3 second time mark. Outgoing timestamp counter 124 continues to advance and send out the data until it reaches the 10 minute, 3 second time mark. At this point, outgoing timestamp counter 124 keeps increasing to 10 minutes, 4 seconds, but no data is available so nothing is sent out until the counter reaches the 11 minute, 3 second time mark. At the 11 minute, 3 second time mark, the data will start coming out again. Thus, we have just replayed the loss of signal to the user.

The solution to the foregoing problem may include at least two different approaches. One approach is to monitor the incoming time stamp (IN_timestamp) of the next data in flash HDD 45. If the next incoming time stamp (IN_timestamp) is greater than a pre-defined threshold for the data, such as 1 second, comparator 136 sends a LOS flag to system control block 120 (see FIG. 3). In the foregoing example, when the outgoing timestamp (OUT_timestamp) should be 10 minutes, 3 seconds, but the next data available is 11 minutes, 3 seconds, a special condition is flagged. When this flag is detected, system control block 120 can update the outgoing timestamp (OUT_timestamp) to the next time stamped data to allow immediate playback of the next data in flash HDD 45 without re-creating the 1 minute of signal loss to the user. After this update, the system continues to reproduce the data as normal, but flash HDD 45 is now only 4 minutes ahead. If the system signal losses add up to a time period that is longer than the pause buffer start delay, the user will see the loss of signal and the system continues to perform in a conventional manner.

A second approach to the foregoing problem is to have LOS detector logic 130 generate a LOS flag which is added as a marker bit or a special flag to indicate that the data is discontinuous and needs to change the outgoing timestamp (OUT_timestamp) of outgoing timestamp counter 124 immediately. This is a much cleaner approach, but requires an additional bit in the timestamp header. If each broadcast channel has its own pause buffer in flash HDD 45, any loss of signal on any channel could be compensated so the user doesn't see a blank screen. This could be useful for multimedia systems where a mix of local and satellite systems may be found on the same public system where a loss of signal on one channel may be completely independent of the other channels.

The aforementioned use of the pause feature, a loss of signal detector, and the masking of lost data is generally useful for consumer applications, but may not be desirable for use in security applications. That is, if security cameras are part of the system being viewed, a special message may be displayed to show that the signal is not real-time, or provisions may be provided to mark a security camera's incoming data with outgoing timestamps so the playback is immediate and not delayed. Otherwise, the security camera can mask the real activity so a crime is never visible to a viewer (e.g., security personnel).

Another aspect of the present invention is to communicate to the user with an on-screen display (OSD) or other type of message to indicate that incoming data was lost, but that the content was advanced for their viewing pleasure. This user notification has multiple purposes: it explains instantaneous changes in the time references, the loss of content in case the remaining program makes no sense due to loss of important information, notifies the user that data was lost and masked in case of security monitoring, and covers the operator for anything odd that might occur in the video and/or audio when slicing video segments together.

For example, a program might be on dieting and list important steps for healthy living, and then show what to avoid and not to do. If a segment is lost, the important steps for healthy living may only list the items to be avoided, without any explanation. Another example could be a phone number from two different commercials where the first commercial leads up to a phone number, but the signal is lost and the display shows the second commercial's phone number in error. Also according to this aspect of the present invention, a user may be provided an option (e.g., via an OSD menu, etc.) to select whether to skip the portion of the signal lost during the signal loss period. If the user selects not to skip the portion of the signal lost during the signal loss period, the portion of the signal lost during the signal loss period may be replaced with a default signal.

If a user is using a personal video recorder (PVR), the program may be minutes, hours, or days later than real-time. If rain fade occurred during the storing of the program, the user may get to watch a "loss of signal" message or no signal at all for a time period in which the rain fade occurred. According to the present invention, the user is notified that some content was lost, but he or she will experience a continuous program, rather than a disruptive period where the screen is blank.

According to another aspect of the present invention, if there is not sufficient data in flash HDD 45, for example, the buffer length is less than a pre-defined threshold, the data may be played back at a speed slower than its normal speed. The playback speed may later return to the normal speed when the buffer length is not less than the pre-defined threshold. The pre-defined threshold may for example be set manually by a user, or automatically by the system determining the frequency at which that the buffer length falls below the threshold. According to this aspect of the present invention, the number of received data segments stored in flash HDD 45 is determined, and playback or reproduction speed is adjusted based on this number. For example, the adjustment may be made such that if the number is smaller than a threshold, the playback or reproduction speed is reduced to be lower than a normal speed. Conversely, if the number is equal to or greater than the threshold, the playback or reproduction speed is maintained at the normal speed.

In the event of rain fade, for example, a 10 second delay may be sufficient to jump over the rain fade event. In this case, the video and/or audio may be reproduced at a slightly reduced speed until a desired buffer time for flash HDD 45 is recovered. Then, if signal loss occurs, the buffer may be consumed and the time period of the signal loss may be jumped over. After the event, reduced playback speed may occur again until the desired buffer time is recovered. In addition, you could look at the history of the system. If the system frequently is not getting enough rain fade jump time, the desired buffer time may be increased automatically. Moreover, the desired buffer time for flash HDD 45 may be adjustable based on the time of year. A service provider may also set the desired buffer time for flash HDD 45 based, for example, on how many customer complaints they are receiving for an area or even an individual customer (e.g., a user who mounts his own satellite dish behind some trees, etc.). Playback speed may also be accelerated when the end of a program is nearing, at the risk of not having enough buffered time, so that a user will not be late for a next program that is back-to-back.

Figure 5:
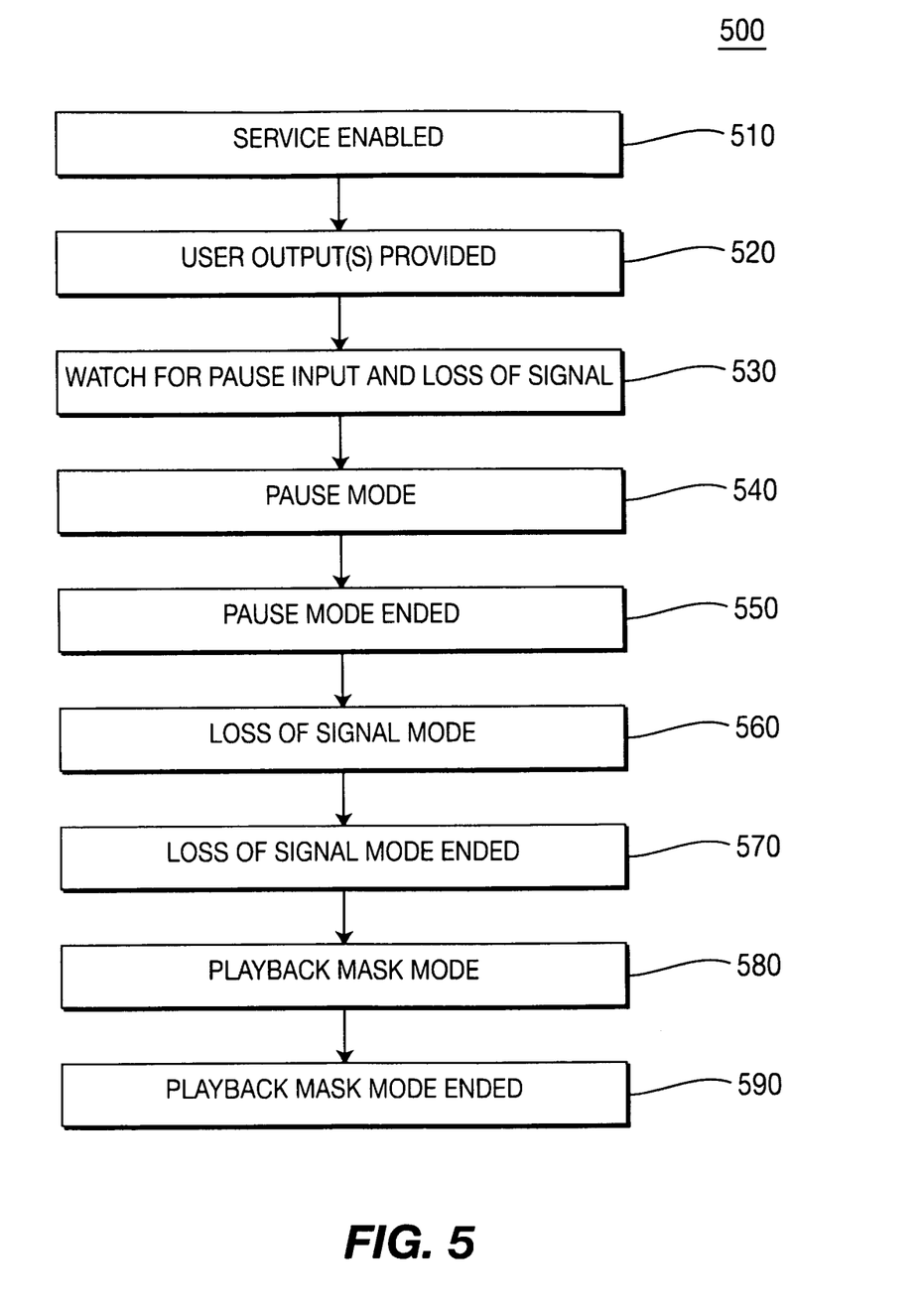
FIG. 5 is a flowchart illustrating steps according to an exemplary embodiment of the present invention.

Referring to FIG. 5, a flowchart 500 illustrating steps according to an exemplary embodiment of the present invention is shown. The steps of FIG. 5 may for example represent the functionality of software programmed into system control block 120 of packet processor 30. The steps of FIG. 5 are only exemplary, and are not intended to limit the present invention in any manner.

At step 510, a service for masking signal loss conditions is enabled. According to an exemplary embodiment, the service may be available in a network that distributes signals including audio and/or video signals to a plurality of users, such as passengers on a bus, train, airplane, subway, ship and/or other mobile location, for reproduction. The service may also be available in other networks, such as those in home and business dwellings. The service may for example be enabled at step 510 in response to one or more predetermined user inputs to a system such as the one shown in FIG. 1. Once the service is enabled at step 510, digital data begins streaming directly to a buffer memory such as flash HDD 45 of FIG. 1, but not to system users (e.g., passengers, etc.).

At step 520, one or more user outputs are provided. According to an exemplary embodiment, the one or more system users begin receiving the reproduced outputs (e.g., audio and/or video outputs) a predetermined time period (e.g., 5 minutes, 1 hour, etc.) after the service is enabled at step 510. This delay allows flash HDD 45 of FIG. 1 to begin accumulating digital data. This delay may be enabled in FIG. 2 for example by programming outgoing timestamp counter 124 with an outgoing timestamp (OUT_timestamp) value that is less than the incoming timestamp (IN_timestamp) value of incoming timestamp counter 122 by an amount corresponding to the predetermined time period.

At step 530, the system watches for a pause input and a loss of signal condition. According to an exemplary embodiment, system control block 120 of FIGS. 2 and 3 is capable of detecting a pause signal input from a user and a LOS flag indicating a loss of signal condition. If a pause signal input is not detected, data continues to be streamed directly to flash HDD 45, and is later provided to the one or more users in a delayed manner. If a pause signal input is detected, system control block 120 stores the current outgoing timestamp (OUT_timestamp) value from outgoing timestamp counter 124 as a pause start time, and enters the pause mode. If a loss of signal condition is detected, a loss of signal mode is entered. Both of these modes will hereinafter be described.

At step 540, the pause mode begins. According to an exemplary embodiment, the incoming data stream is stored in flash HDD 45 during the pause mode. Also, the applicable user terminal (e.g., set-top box, etc.) that provided the pause input signal receives a message to indicate that the pause mode has been entered and that data streaming to the user terminal has stopped. If the user provides another input signal to end the pause mode, system control block 120 stores the current incoming timestamp (IN_timestamp) value from incoming timestamp counter 122 as a pause stop time, and ends the pause mode. Otherwise, the pause mode continues.

At step 550, the pause mode ends. According to an exemplary embodiment, when the pause mode ends, system control block 120 looks up the previously stored pause start time (i.e., the outgoing timestamp (OUT_timestamp) value from outgoing timestamp counter 124 at the time of entering the pause mode) to identify an address in flash HDD 45 for data beginning at the pause start time. Incoming data continues to be stored as it did during the pause mode. Also at step 550, system control block 120 programs outgoing timestamp counter 124 with an outgoing timestamp (OUT_timestamp)

value that corresponds to the pause start time, and enables data from flash HDD 45 to be streamed to the user(s).

At step 560, the loss of service mode begins. According to an exemplary embodiment, the loss of service mode begins at step 560 in response to system control block 120 detecting a LOS flag from LOS detector logic 130 indicating a loss of signal condition. During the loss of service mode, incoming data to flash HDD 45 has stopped, but data continues to be streamed to the user(s).

At step 570, the loss of service mode ends. According to an exemplary embodiment, the loss of service mode ends at step 570 when LOS detector logic 130 detects that the signal has returned. Once this occurs, system control block 120 sets the LOS flag in the first returned data packet sent to flash HDD 45. Also, data streaming to flash HDD 45 and the user(s) continues.

At step 580, a playback mask mode begins. According to an exemplary embodiment, when the set LOS flag is detected from a data packet provided from flash HDD 45, system control block 120 sets the outgoing timestamp (OUT_timestamp) equal to the incoming timestamp (IN_timestamp) for this packet (see FIG. 4). This causes the playback mask mode to begin such that data reproduction will skip over the signal loss period and audio and/or video will continue to be reproduced for the user(s). Also during the playback mask mode, the user(s) is notified (e.g., via an OSD message, etc.) that some portion of the incoming signal was lost. The user(s) may also be informed of the duration of the signal loss period.

At step 590, the playback mask mode ends. According to an exemplary embodiment, the end of the playback mask mode causes the system to continue with normal operation by reading data from flash HDD 45 using the outgoing timestamps (OUT_timestamps) so that data packets are output at the appropriate time. This normal operation continues until either a pause input signal or a loss of signal condition is detected. If a pause input signal is detected, the pause mode is entered as previously described herein. If a loss of signal condition is detected, the loss of signal mode is entered as previously described herein. The foregoing operation continues for as long as the service for masking signal loss conditions is enabled (see step 510).

As described herein, the present invention provides a method and apparatus for masking signal loss conditions in signal distribution and reproduction networks. While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method, comprising steps of:
   receiving a signal;
   detecting a period of loss of said signal;
   enabling a received portion of said signal to be reproduced continuously and causing a portion of said signal lost during said period to be skipped during said reproduction; and
   notifying a user during said reproduction that some portion of said signal was lost, wherein said notifying step includes informing said user of a duration of said period.

2. The method of claim 1, wherein said signal comprises a plurality of segments, and said method further comprises a step of:
   storing each received segment in a buffer, wherein each stored segment includes a time mark.

3. The method of claim 2, further comprising a step of adding said time mark to said each received segment.

4. The method of claim 2, further comprising steps of:
   determining a number of said received segments stored in said buffer; and
   adjusting a reproducing speed during said enabling step according to said number.

5. The method of claim 4, wherein said adjusting step comprises steps of:
   if said number is smaller than a threshold, reducing said reproducing speed to be lower than a normal speed; and
   if said number is equal to or greater than said threshold, maintaining said reproducing speed at said normal speed.

6. The method of claim 1, further comprising steps of:
   enabling said user to select whether to skip said portion of said signal lost during said period; and
   if said user selects not to skip said portion of said signal lost during said period, said enabling step includes replacing said portion of said signal lost during said period with a default signal.

7. The method of claim 1, wherein said signal includes at least one of audio and video content.

8. An apparatus, comprising:
   an input operative to receive a signal including at least one of audio and video content;
   a detector operative to detect a period of loss of said signal; and
   a controller operative to enable a received portion of said signal to be reproduced continuously and to cause a portion of said signal lost during said period to be skipped during said reproduction, wherein a user is notified during said reproduction that some portion of said signal was lost and said notification informs said user of a duration of said period.

9. The apparatus of claim 8, wherein said signal comprises a plurality of segments, and said apparatus further comprises:
   a memory operative to store each received segment, wherein each stored segment includes a time mark.

10. The apparatus of claim 9, wherein a reproducing speed is adjusted during said reproduction according to a number of said received segments stored in said memory.

11. The apparatus of claim 10, wherein:
    if said number is smaller than a threshold, said reproducing speed is reduced to be lower than a normal speed; and
    if said number is equal to or greater than said threshold, said reproducing speed is maintained at said normal speed.

12. The apparatus of claim 8, wherein:
    said user selects whether to skip said portion of said signal lost during said period; and
    if said user selects not to skip said portion of said signal lost during said period, said portion of said signal lost during said period is replaced with a default signal.

* * * * *